(12) United States Patent
Flores (10) Patent No.: US 11,644,149 B2
(45) Date of Patent: May 9, 2023

(54) ELECTRICAL BOX CONNECTION TO A SUPPORT ROD

(71) Applicant: Victor Manuel Flores, Santa Cruz, CA (US)

(72) Inventor: Victor Manuel Flores, Santa Cruz, CA (US)

( * ) Notice: Subject to any disclaimer, the term of this patent is extended or adjusted under 35 U.S.C. 154(b) by 96 days.

(21) Appl. No.: 17/346,272

(22) Filed: Jun. 13, 2021

(65) Prior Publication Data

US 2022/0333734 A1   Oct. 20, 2022

Related U.S. Application Data (60) Provisional application No. 63/258,227, filed on Apr. 19, 2021.

(51) Int. Cl.
| | |
|---|---|
| *F16M 11/00* | (2006.01) |
| *F16M 13/02* | (2006.01) |
| *F16B 2/06* | (2006.01) |
| *H02G 3/08* | (2006.01) |

(52) U.S. Cl.
CPC ........... *F16M 13/022* (2013.01); *F16B 2/065* (2013.01); *H02G 3/08* (2013.01)

(58) Field of Classification Search
CPC ........ F16M 13/022; F16B 2/065; H02G 3/08; H02G 3/30; H02G 3/081
See application file for complete search history.

(56) References Cited

U.S. PATENT DOCUMENTS

| | | | | | |
|---|---|---|---|---|---|
| 2,956,798 | A | * | 10/1960 | Briggs | H02G 3/126 269/254 R |
| 2,962,281 | A | * | 11/1960 | Hodgson | H02G 3/125 269/254 R |
| 3,436,070 | A | * | 4/1969 | Sanson | H02G 3/125 269/95 |
| 4,087,913 | A | * | 5/1978 | Jackson | B28D 1/041 30/360 |
| 4,635,372 | A | * | 1/1987 | Tande | B25B 11/00 269/50 |
| 4,747,506 | A | * | 5/1988 | Stuchlik, III | H02G 3/125 220/3.9 |
| 4,750,271 | A | * | 6/1988 | Ericksen | B25B 5/06 269/904 |
| 4,757,967 | A | * | 7/1988 | Delmore | H02G 3/126 248/27.1 |
| 4,850,115 | A | * | 7/1989 | Price | H02G 3/125 D10/64 |
| 5,067,247 | A | * | 11/1991 | Milichichi | H02G 3/12 33/DIG. 10 |
| 5,317,108 | A | * | 5/1994 | Prairie, Jr. | H02G 3/14 174/67 |
| 5,348,274 | A | * | 9/1994 | Breen | H02G 1/00 269/3 |

(Continued)

*Primary Examiner* — Amy J. Sterling
(74) *Attorney, Agent, or Firm* — Donald R. Boys; Central Coast Patent Agency LLC (57) ABSTRACT

A fitting and a method of using that fitting to install electrical boxes to a vertical ceiling support rod. This installation does not require a complex bracket that attaches to a wall or a stud in a wall. Prior installation problems of electrical box dropping and rotation are eliminated with this invention. Installation is simple and cost effective. Special tools are not required.

10 Claims, 7 Drawing Sheets

(56) References Cited

U.S. PATENT DOCUMENTS

| | | | | |
|---|---|---|---|---|
| 5,491,901 | A * | 2/1996 | Parrino | H02G 3/126 33/528 |
| 6,800,806 | B1 * | 10/2004 | Grday | H02G 3/126 439/535 |
| 7,173,186 | B1 * | 2/2007 | Hageman | H02G 3/125 174/57 |
| 7,771,094 | B2 * | 8/2010 | Goode | H02G 3/126 362/147 |
| 9,470,360 | B2 | 10/2016 | Korcz et al. | |
| 9,494,307 | B2 | 11/2016 | Wronski et al. | |
| 10,527,223 | B2 * | 1/2020 | Fruh | F16M 13/02 |
| 10,554,030 | B1 | 2/2020 | Baldwin et al. | |
| 10,731,961 | B2 | 8/2020 | Trent | |
| 10,868,413 | B1 * | 12/2020 | Anshu | H01R 13/748 |
| 2006/0265893 | A1 | 11/2006 | Gifford | |
| 2014/0264220 | A1 * | 9/2014 | Doyle | E04H 17/143 256/65.06 |

* cited by examiner

ELECTRICAL BOX CONNECTION TO A SUPPORT ROD

CROSS-REFERENCE TO RELATED APPLICATIONS

This application claims benefit to U.S. provisional application 63/258,227 dated Apr. 19, 2021 filed by Victor Flores. Confirmation number 6185. Provisional application 63/258,227 is hereby incorporated by reference in its entirety.

STATEMENT REGARDING FEDERALLY SPONSORED RESEARCH

Not Applicable
REFERENCE TO A MICROFICHE APPENDIX
Not Applicable

BACKGROUND OF THE INVENTION

Field of the Invention

This invention relates to connecting an electrical box to a support rod that is suspended from a ceiling. Particularly, an invented fitting leads to a sturdy, but simple, method of installation.

Description of Related Art

Connecting electrical boxes to a support rod is a long-established practice in the electrical field. A support rod is anchored to the ceiling structure and hangs downward toward the floor.

One or more electrical boxes are attached to the support rod. An attachment between each electrical box and support rod is currently made by a friction retainer. Cables enter the electrical box through punch-out holes in the electrical box body. Some cables are heavy.

There are two major problems with the current technique, which uses the friction retainer.

First, heavy cables cause the installed electrical box to rotate because the friction retainer does not adequately prevent rotation. This happens frequently. Rotation occurs in the direction of the heaviest cables.

Second, the electrical box slides downward toward the floor. This can occur long after the installation is complete. Sliding is the more serious problem. The installation must be redone.

These two problems have been recognized for a long time. But no satisfactory solution has been offered by the prior art.

There is a need for a better way to install electrical boxes on a ceiling support rod.

BRIEF SUMMARY OF THE INVENTION

The present invention is a method of using an invented fitting to connect an electrical box to a support rod. The invented fitting addresses both the rotation and drop (sliding) problems. The fitting is specific to the method, and the method is specific to the fitting.

The invented fitting fits concentrically over the support rod and possesses three functional features. Those three features are disposed on the long axis of the fitting.

The first feature (an attachment pin) fits through a first hole in the electrical box and serves to anchor the fitting to the electrical box. In a preferred embodiment, the attachment pin is threaded, and it uses a matching nut to complete the anchoring.

A second feature (an alignment pin) fits through a second hole in the electrical box to prevent rotation of the electrical box. The alignment pin may be threaded or not threaded. The alignment pin may be straight or bent.

The third feature (a rod screw) is not on the same side of the fitting as the attachment pin and alignment pin. In preferred embodiments, a rod screw is angled 45 to 315 degrees away from the attachment and alignment pins as viewed along the fitting's long axis. When tightened, a rod screw locks the fitting to the support rod. A rod screw also allows the electrical box to slide up or down on the support rod by releasing the rod screw's force.

In short, the following goals are met: (1) the electrical box cannot rotate or drop, and (2) the height of the electrical box is adjustable.

A Brief Summary cannot cover all details, and no limitations should be read into this Brief Summary. For example, embodiment diagrams are based on cylindrical fittings and rods. But that is not a limitation. Rods and fittings may have polygon cross sections and remain within the inventive concept. Screws and nuts are not the only practical attachments. Cotter keys, retainers, glue, polymeric grips, welding, soldering and other common joining techniques may also be used within the inventive concept.

The method of using the fitting includes (1) anchoring the support rod to the ceiling or selecting an already-installed support rod (2) connecting the fitting to the support rod with a rod screw, and (3) attaching the electrical box to the fitting with an attachment pin and an alignment pin. The net effect is to firmly combine the electrical box, the fitting, and the support rod into a solid unit.

The order of method steps may vary depending on the electrician's preference and space considerations.

In some cases, a user may wish to disassemble the invented fitting and install the attachment pin and alignment pin from the inside of the electrical box toward the fitting. Or an electrician may choose to supply his/her own parts and build the fitting in place. Those choices result in the same structure and method, and they are within the inventive concept. The invented fitting and invented method are still used.

BRIEF DESCRIPTION OF THE SEVERAL VIEWS OF THE DRAWINGS

FIGS. 1A, 1B and 1C illustrate structural features of an invented fitting plus how the fitting combines with both an electrical box and a support rod. Both the electrical box and the fitting are drawn in a cutaway format. As shown, both pins passing through the back plate of the electrical box are threaded to receive a nut. But threading for the alignment pin is optional. This embodiment shows a spacing of 1.5 inches (center to center) between the attachment pin and alignment pin. Many standard electrical boxes have a hole spacing of 1.5 inches (center to center). So, this embodiment fits with standard commercial electrical boxes without modification.

FIG. 5 shows an embodiment in side-view. Here the rod screw is sharp and disposed at a downward angle to the support rod. Both the sharp rod screw and the downward angle provide a firmer connection between the support rod and the rod screw. More weight from the electrical box causes the rod screw to dig deeper into the support rod.

DETAILED DESCRIPTION OF THE INVENTION

Figure 1A:
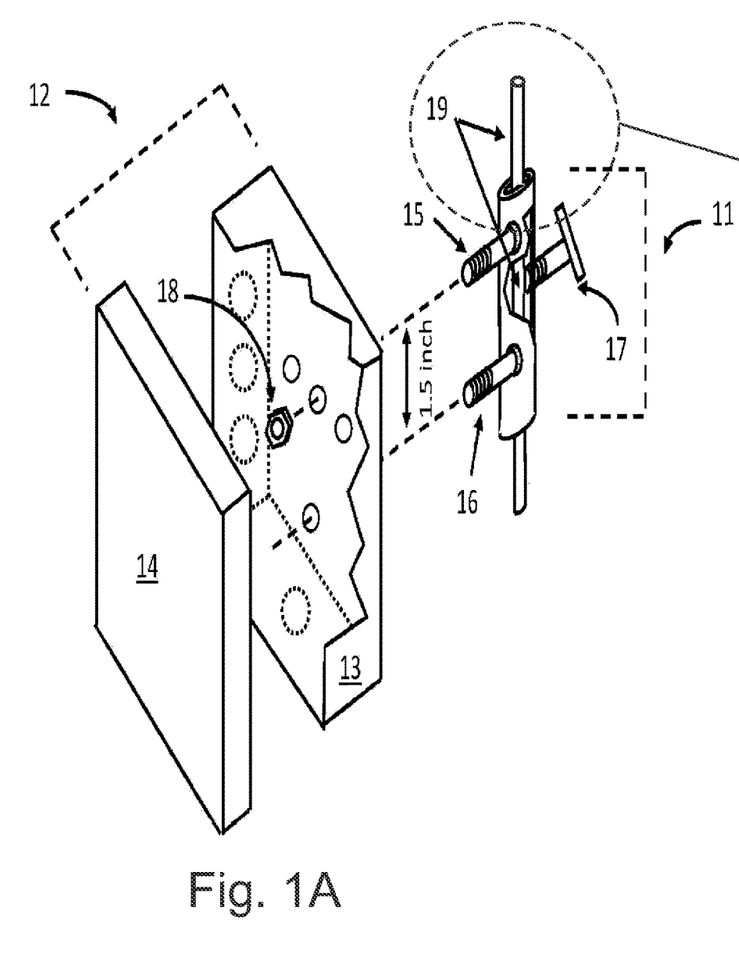
FIG. 1A shows an exploded diagram of the invention with a round support rod.
Figure 1B:
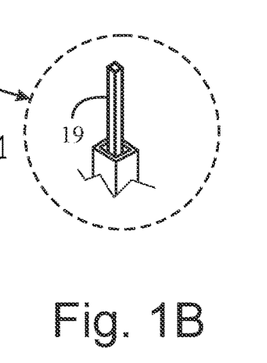
FIG. 1B illustrates a polygonal support rod and a fitting with a polygonal hole for the support rod.
Figure 1C:
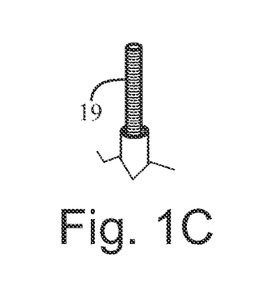
FIG. 1C illustrates a support rod that is either threaded or grooved.

Refer to FIGS. 1A, 1B and 1C. An invented fitting 11 connects to the back plate 13 of an electrical box 12. In this diagram, the front plate 14 of the electrical box has been opened to see inside. Both the fitting 11 and the back plate 13 are cut away.

The invented fitting 11 also connects to a support rod 19, which is normally anchored to the ceiling and hangs downward. Hence, the invented fitting 11 ties both the electrical box 12 and the support rod 19 together. In FIG. 1A support rod 19 and a hole for the support rod in the invented fitting both have a round cross-section. In FIG. 1B the support rod and the hole are shown with polygonal cross section. In FIG. 1C the support rod is shown to be threaded or grooved.

The invented fitting 11 also connects to a support rod 19, which is normally anchored to the ceiling and hangs downward. Hence, the invented fitting 11 ties both the electrical box 12 and the support rod 19 together.

In this embodiment, an attachment pin 15 and an alignment pin 16 pass through the back plate 13 to make a connection. Both pins 15,16 are shown as threaded to mate with a nut 18 inside the electrical box 12. However, threading the alignment pin 16 is optional since its designed function is to prevent rotation of the electrical box 12 around the fitting 11. No mating nut is shown for alignment pin 16 to support this point.

In FIG. 1, attachment pin 15 is responsible for making a solid connection between the invented fitting 11 and the back plate 13. As drawn for this embodiment, a nut 18 mates with the threading of the attachment pin 15. But other means of connecting are available withing the scope of the invention and within the skill of an electrician possessing ordinary skill. This inventive concept is further not limited to threaded attachment pins 15. For example, a cotter key (not shown) and a receiving hole (not shown) in an unthreaded attachment pin would work equally well.

One of ordinary skill could select alternate attachment hardware from a standard catalog of connectors.

A rod screw 17 holds the support rod 19 firmly to prevent dropping. This screw may be a standard screw or a set screw for extra holding power.

In combination, the rod screw 17, the attachment pin 15 and the alignment pin 16 solve the problems of the prior art. Neither dropping (sliding) nor rotation are expected. When an electrician returns the next day, the electrical box will be in the same position. Repairs or re-installation are unnecessary.

Figure 2:
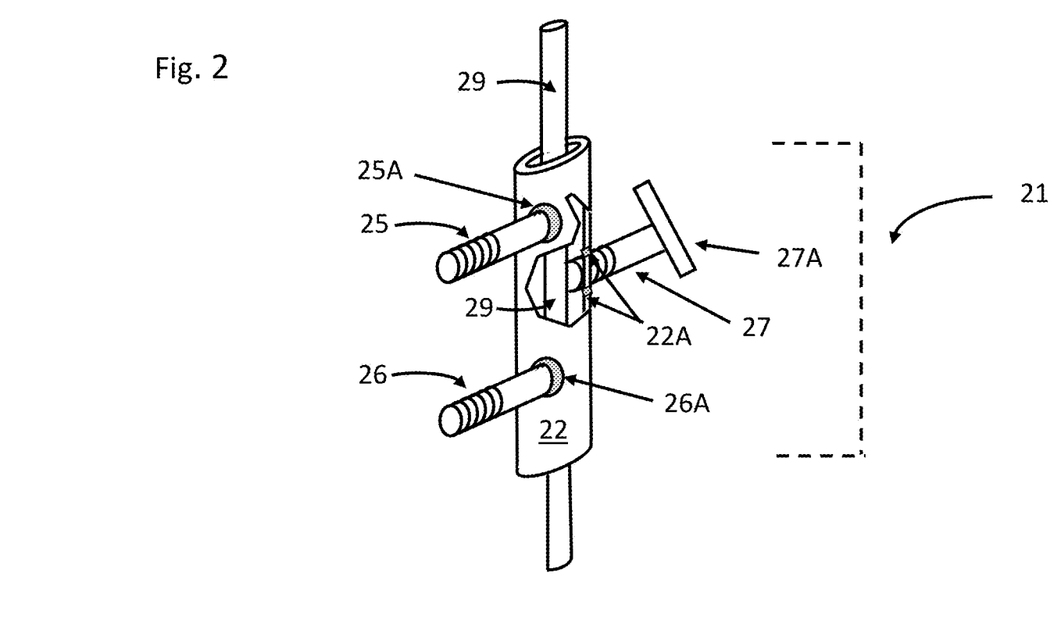
FIG. 2 shows an invented fitting positioned around a support rod. The invented installation method is based on using an invented fitting. The body of the fitting is cut away to show a rod screw contacting the support rod.

Refer to FIG. 2. FIG. 2 focuses on details for an invented fitting 21. As drawn, the main body 22 is a hollow cylinder, which concentrically surrounds a cylindrical support rod 29. If the support rod has a cross section that is a triangle, square, rectangle or other polygon, the main body may employ the same shape to surround the support rod 29 with minimal wobble.

Loosening the rod screw 27 allows the invented fitting 21 to slide upward and downward on the support rod 29. When the proper height is reached, the rod screw 27 is tightened to lock-in that height. A torque handle 27A allows for higher manual force on the support rod 29. It makes installation easier. However, the torque handle 27A is optional and not a required feature of the invented fitting 21.

The attachment pin 25 can be solidly fixed or removably fixed. If the attachment pin 25 is removably fixed, the mating surface 25A may be a female threaded orifice in the fitting body 22. If the attachment pin 25 is solidly fixed, the mating surface 25A may be a welded or soldered joint.

The alignment pin 26 can also be solidly fixed or removably fixed. The mating surface 26A may be a female thread for a removable alignment pin 26. Soldering or welding might be used for a solidly fixed alignment pin 26.

One of ordinary skill has multiple options for fixed or removable mating surfaces 25A, 26A. Choices selected from an engineering catalog or manual offer multiple high-probability routes.

The inventor's prototype was made from a steel body 22 with threaded mating surfaces 25A, 26A. Wall thickness was 2 mm, which was adequate for threading. An intentional effort to strip the thread of the attachment pin's 25 mating surface 25A failed. The mating surface held strong.

In commercial quantities, the fitting 21 may be manufactured as a cast part.

Referring back to FIG. 1, note that most electrical boxes 12 are manufactured with precise standard dimensions. First, for most electrical boxes 12 the distance between nearest-neighbor back plate 13 holes is precisely 1.5 inches (center to center). Second, the diameter of each back plate 13 hole is slightly greater than 0.25 inch, which allows 0.25-inch pins to pass through easily.

Return to FIG. 2. Capitalizing on standard commercial dimensions leads to a preferred embodiment. In this embodiment, attachment pins 25 and alignment pins 26 both have a 0.25-inch diameter. Furthermore, the spacing between pins 25,26 is 1.5 inches. This means that the pins 25,26 exactly match the electrical box. No extra holes need to be drilled, which saves time and money for the installation. Also, the connection between the invented fitting and the electrical box has a sturdy feel.

Figure 3:
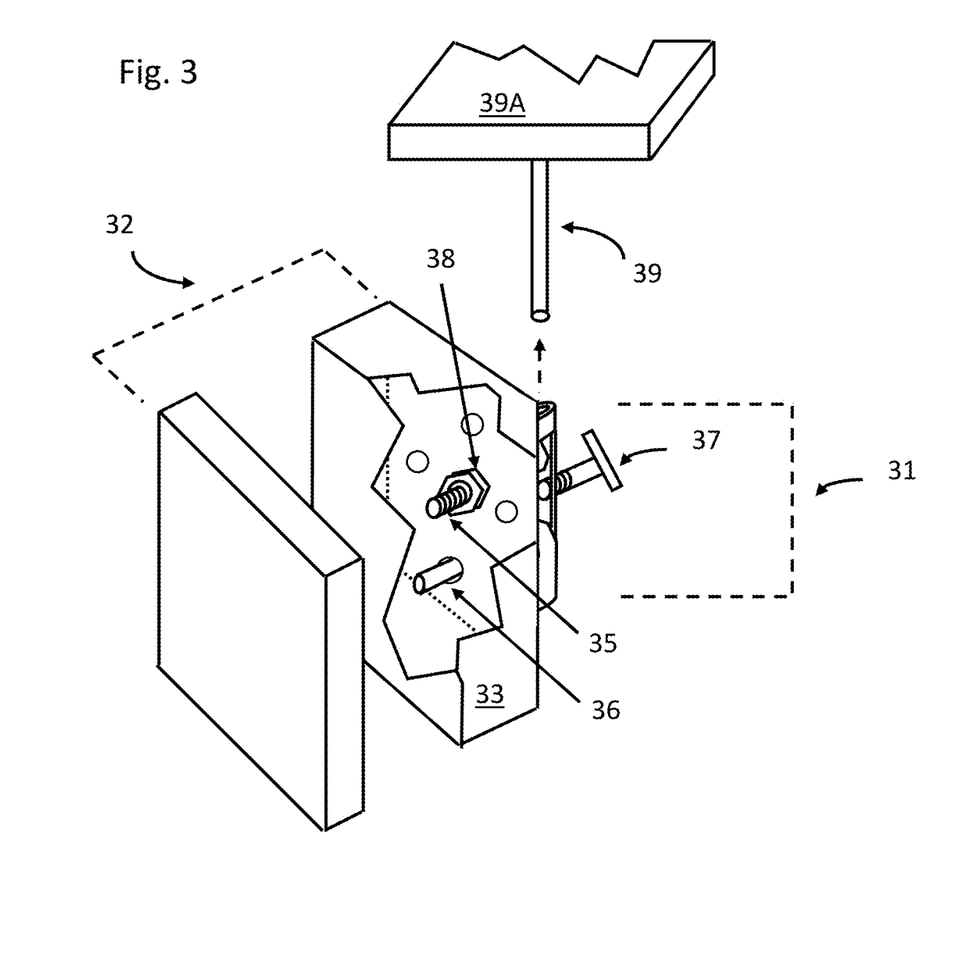
FIG. 3 shows the fitting positioned on the back plate of the electrical box. The fitting is partly hidden. Note that the bottom pin is not threaded or otherwise restrained because it serves as an alignment pin to prevent rotation.

Refer to FIG. 3. The method of installation begins by installing a support rod 39 from the ceiling 39A. Alternately, an already-installed support rod is used. The order of the following steps is not fixed. An electrician will determine the order, based on working space, convenience, and personal preference.

Connecting the invented fitting 31 to the back plate 33 of an electrical box 32 accomplished by inserting the attachment pin 35 and the alignment pin 36 through two pre-existing holes in the back plate 33 as shown in FIG. 3. The location and size of the pre-existing holes is standardized for electrical boxes. For common electrical boxes, hole spacing of 1.5 inches is present.

The attachment pin 35 is locked in place. In FIG. 3, a nut 38 is used. Other means of locking are within the scope of the invention since alternate choices are based on choosing from a known list of standard options with a high probability of success. The alignment pin 36 does not have to be locked in place, but it can be. It is optional.

With the rod screw 37 retracted, the fitting 31 is positioned around the support rod. In this condition, the fitting slides up-and-down freely. When the appropriate height of the electrical box 32 is achieved, the rod screw 37 is tightened into the support rod 39 to maintain that height.

Minimal variations to the installation method are possible, but they remain within the inventive concept.

Figure 4:
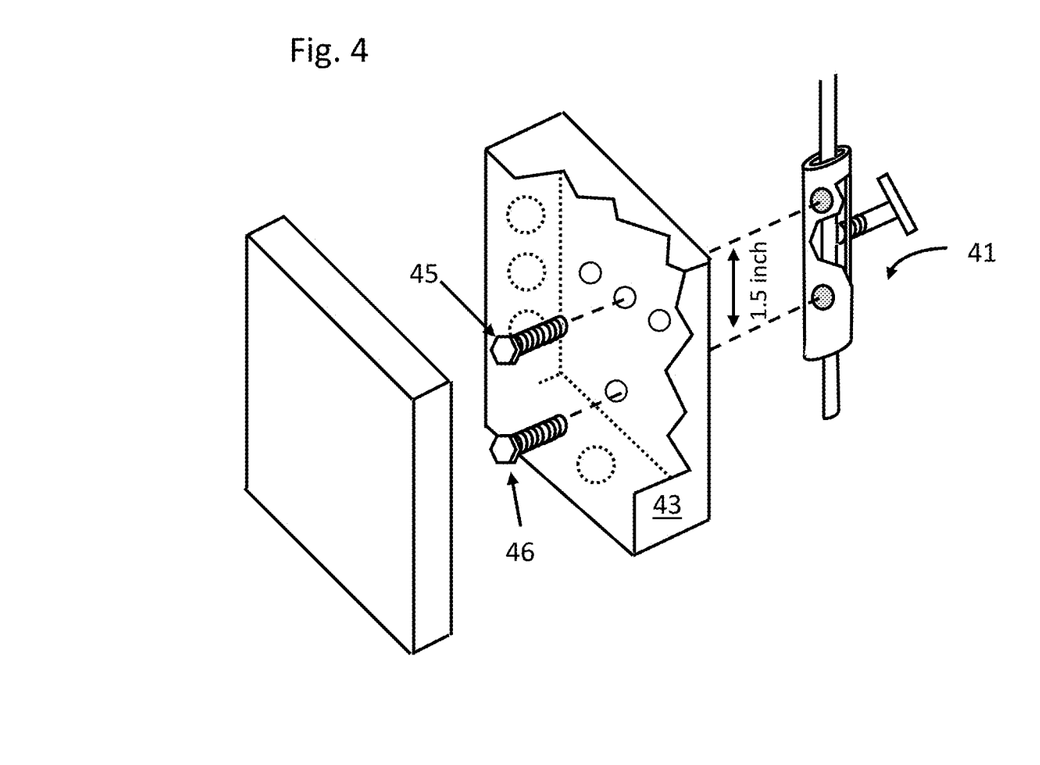
FIG. 4 describes an embodiment wherein two screws are first removed from the fitting. Then the screws are replaced from the back plate of the electrical box. Different screws may also be used for the replacement without changing the inventive concept. This variation makes the fitting in place, which remains covered by the inventive concept. Both the back of the electrical box and the fitting are cut away for clarity.

For example, refer to FIG. 4. Rather than directing the attachment pin 45 and the alignment pin 46 from the fitting 41 into the back plate 43, the direction is reversed. The pins 45,46 are directed from the inside of the back plate to the fitting 41. The pins 45,46 may be taken from a previously assembled fitting 41, or different pins could be used. Either way, the fitting 41 and the method of use are not meaningfully altered.

Figure 5:
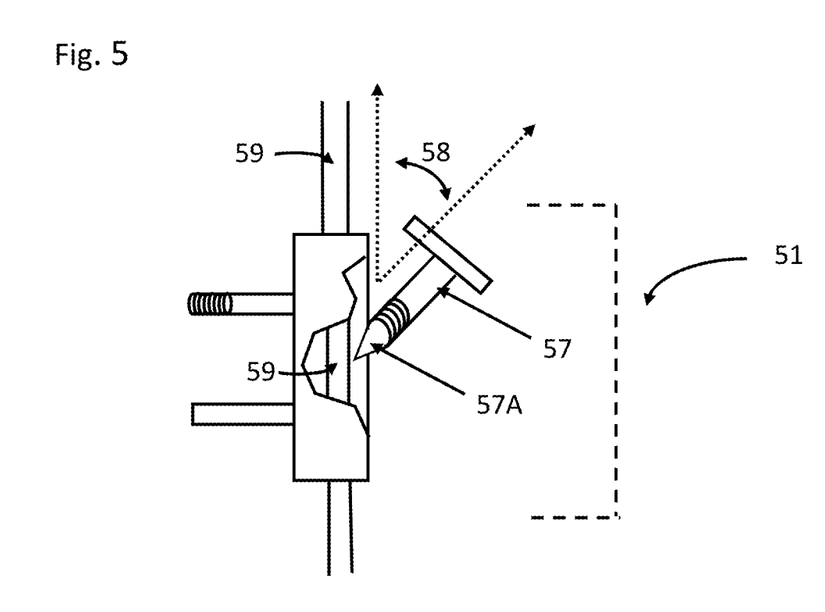

Refer to FIG. 5. In this fitting 51 embodiment, the rod screw 57 has a sharp point 57A, which allows penetration into the support rod 59. The rod screw 57 is also placed at a downward angle 58 into the support rod 59. This provides a very secure connection between the support rod 59 and the rod screw 57. The probability of the electrical box slipping downward is low. The more weight that an electrical box exerts on the fitting 51, the more the sharp point 57A digs into the support rod 59.

Figure 6:
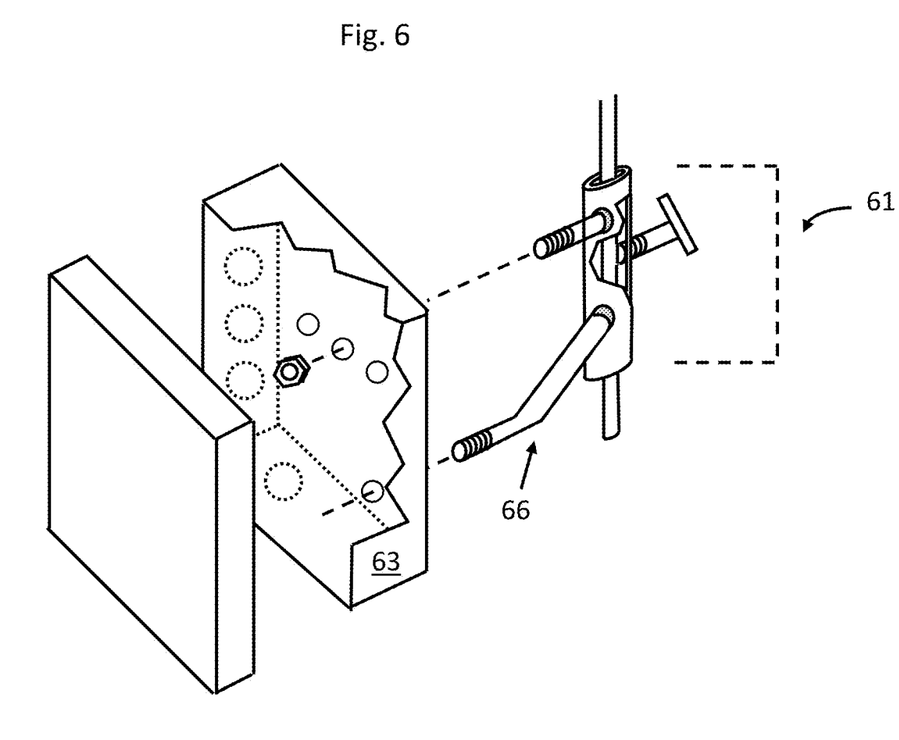
FIG. 6 is an embodiment where the electrical box does not have standard holes distanced 1.5 inches apart. Large electrical boxes may have this condition. The alignment pin's shape and length are modified to access a more distant hole.

Refer to FIG. 6. Here the fitting 61 has been modified to fit a large or non-standard electrical box. Holes in the back plate 63 are not 1.5 inches apart. The alignment pin 66 has been shaped to fit the holes that are available. Functionally, the effect is the same. The alignment pin 66 prevents rotation.

Figure 7:
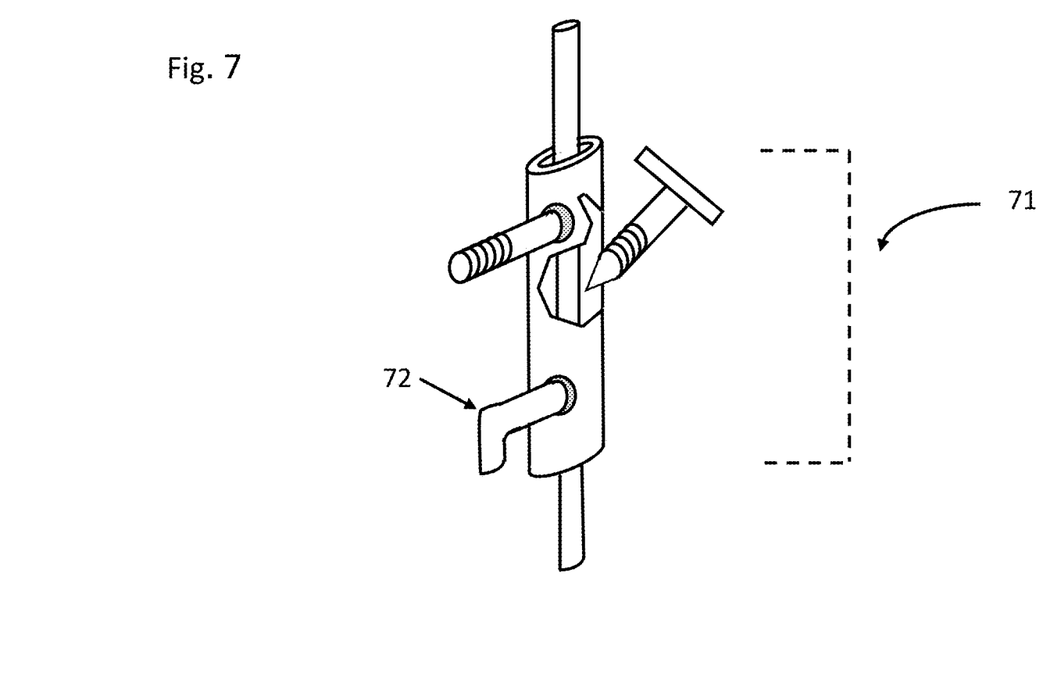
FIG. 7 shows an invented fitting with a bent alignment pin. When installed, the bent alignment pin helps isolate the alignment pin from wires inside the electrical box. Since some wires are hot, this is a safety feature.

Refer to FIG. 7. A bent alignment pin 72 has been included into the fitting 71 for safety. When the fitting 71 is installed, the bent alignment pin 72 remains close to the inside of the back plate. Hence, the bent alignment pin 72 does not extend far into the electrical box and does not interfere with wiring inside the electrical box.

In one preferred method, the steps are (1) attaching a support rod to a ceiling or using a pre-attached support rod, (2) connecting the invented fitting to the back plate of an electrical box, wherein an attachment pin and an alignment pin pass through holes in back plate of the electrical box (3) sliding the invented fitting over the support rod with the rod screw retracted, and (4) fixing the height of the electrical-box-fitting combination with the rod screw.

Materials of fitting construction may vary. The inventor's preference is steel with a 2 mm wall thickness to prevent stripping of threads, but this is not a requirement.

In this invention, the invented fitting and the invented method are dependent on each other. To the inventor's knowledge, the invented fitting does not have an application beyond electrical box installation, and the method is specific for electrical box installation.

The invention claimed is:

1. A system, comprising:
a support rod having a specific cross-section shape along a length, anchored to a ceiling structure and suspended vertically downward;
a fitting apparatus having a solid body having a specific cross section shape along a vertical length, symmetrical about a vertical axis, with a single vertical hole through the solid body on the vertical axis, of the specific cross-section shape of the support rod, the solid body engaging the support rod by the vertical hole, a threaded attachment pin of a first length, joined to and extending horizontally from the solid body, an alignment pin joined to and extending horizontally from the solid body parallel to and spaced apart from the threaded attachment pin, and a male threaded screw engaged in a threaded hole in the solid body, bearing against the support rod such that the fitting apparatus is anchored to the support rod; and
an electrical box having two holes in a back plate spaced apart by the same spacing as are the attachment pin and the alignment pin extending horizontally from the solid body;
wherein the attachment pin passes through one of the two holes in the back plate and the alignment pin passes through the other, and a threaded nut is engaged to the attachment pin fastening the electrical box securely to the fitting apparatus, such that the electrical box is positioned and supported.

2. The system of claim 1 wherein the attachment pin and the alignment pin are welded, brazed or soldered to the solid body of the fitting apparatus.

3. The system of claim 1 wherein the alignment pin and the attachment pin have a male thread on an end toward the solid body, and are both engaged in female threaded holes in the solid body.

4. The system of claim 1 wherein the specific cross-section shape is round, and the single vertical hole through the solid body has a diameter greater than a diameter of the support rod.

5. The system of claim 1 wherein the specific cross section shape is a polygon and the single vertical hole through the solid body and the support rod have the same polygonal shape in cross section.

6. The system of claim 1 wherein the attachment pin and the alignment pin are spaced apart 1.5 inches.

7. The system of claim 1 wherein the attachment pin and the alignment pin are 0.25-inch diameter.

8. The system of claim 1 wherein the holes in the back plate have a diameter greater than 0.25 inches.

9. The system of claim 4 wherein the support rod is threaded or grooved.

10. The system of claim 1 wherein the male threaded rod screw is engaged in a threaded hole in the solid body at an angle to an axis of the support rod, bearing against the support rod such that the fitting apparatus is anchored to the support rod.

* * * * *